United States Patent Office 3,468,780
Patented Sept. 23, 1969

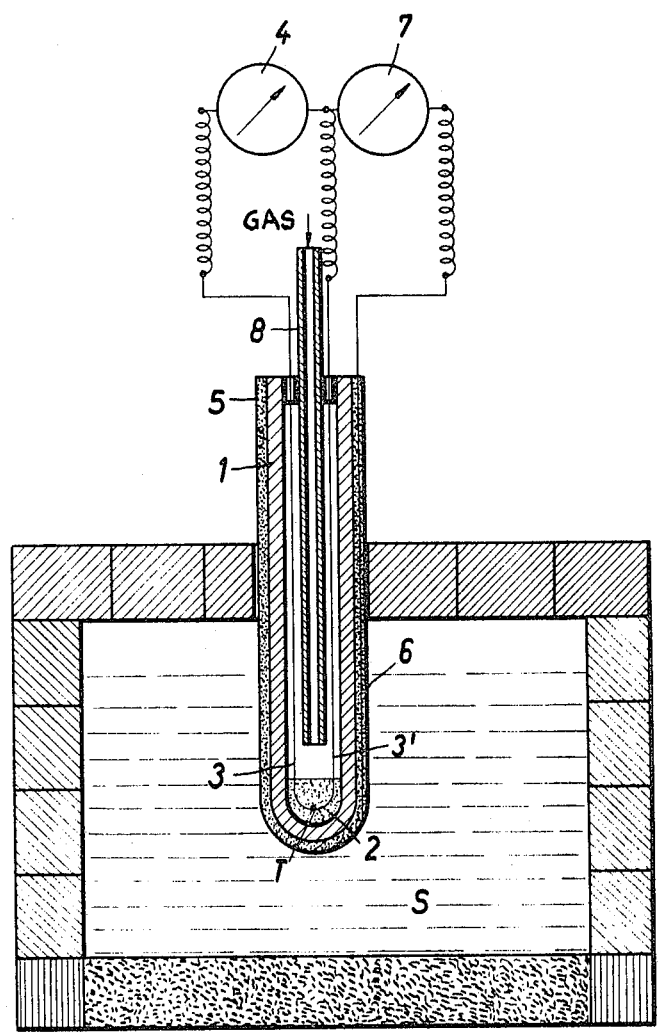

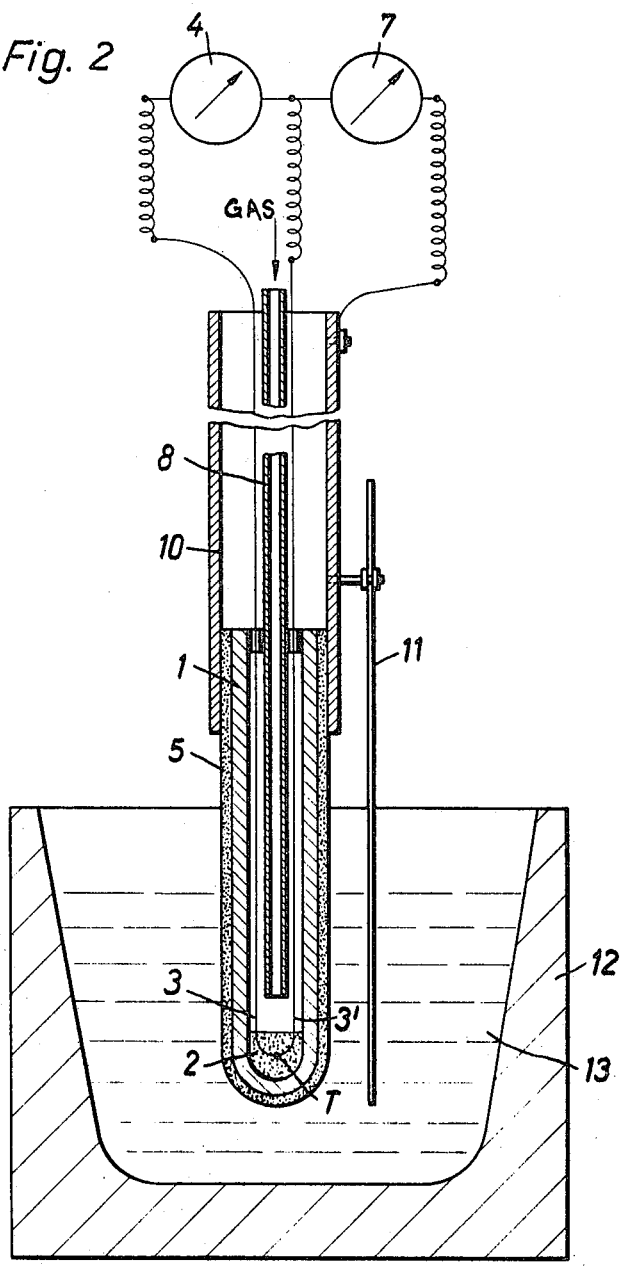

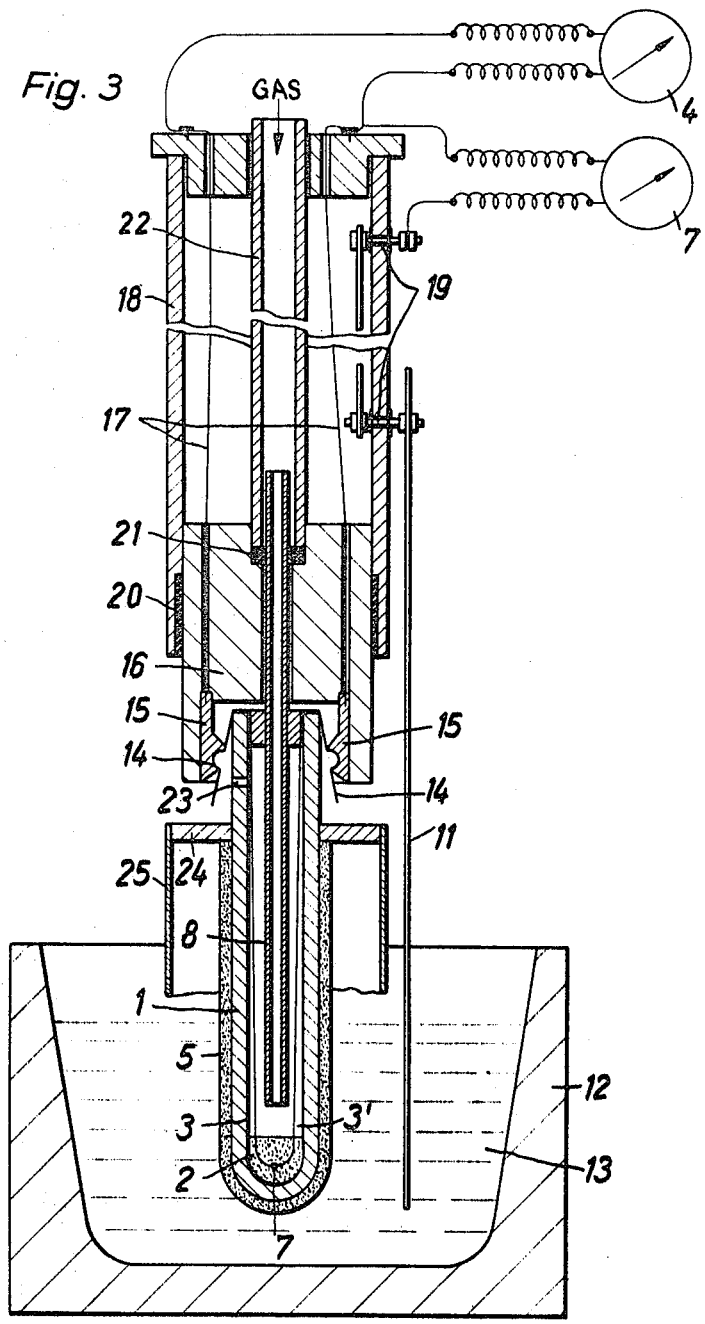

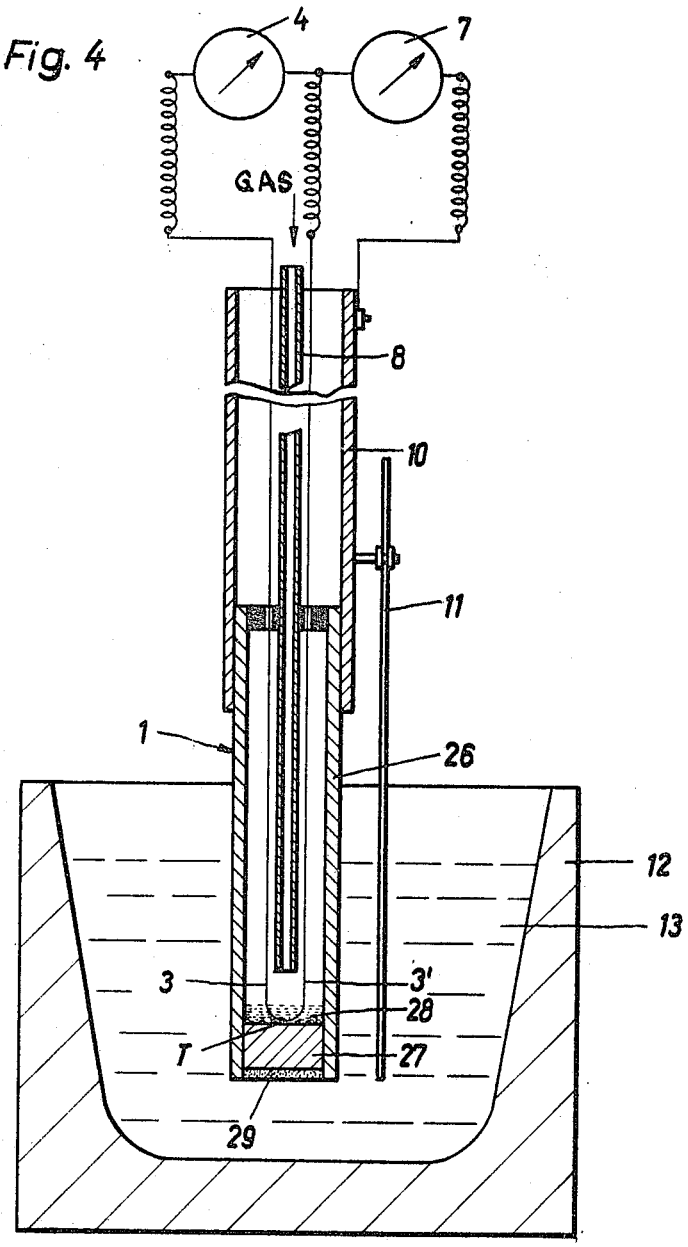

3,468,780
APPARATUS FOR DETERMINING THE OXYGEN CONTENT OF MOLTEN METAL
Wilhelm Anton Fischer, Ratingen, Germany, assignor to Gesellschaft zur Forderung der Eisenhuttentechnik m.b.H., Dusseldorf, Germany
Filed Apr. 4, 1966, Ser. No. 539,714
Claims priority, application Germany, Apr. 8, 1965, G 43,297
Int. Cl. B01k 3/00
U.S. Cl. 204—195      9 Claims

ABSTRACT OF THE DISCLOSURE

Combination in apparatus for determining the oxygen content of molten metal includes a tubular container immersible in the molten metal, the tubular container being formed in part at least of stabilized zirconium oxide rendered impermeable to gas and having applied to its inner and outer surfaces a surface layer of zirconium oxide which is permeable to gas, means for introducing a reference substance to the container, a thermocouple incorporated in the inner bottom layer of zirconium oxide, means for measuring the temperature of the molten metal in which the container is immersible including a millivoltmeter and means electrically connecting the millivoltmeter to the thermocouple, the electrically connecting means comprising an inner electrode of a galvanic cell set up between the reference substance, the container and the melt, and having an outer electrode spaced from the inner electrode, the inner electrode terminating at the thermocouple, and a voltmeter electrically connected between the outer and inner electrodes for measuring the EMF of the galvanic cell.

---

This invention relates to apparatus for determining the oxygen content of molten metals.

Electrochemical methods of determining the oxygen activity of solids has hitherto made use of the so-called solid cell. The solid cell is a galvanic cell in which a reference substance, having known oxygen activity, is separated by an intermediate layer of stabilized zirconium oxide capable of conducting oxygen ions from the solid body, the oxygen activity of which it is desired to determine. The reference substance and the substance, the oxygen activity of which is to be measured, are each connected through a cable to a millivoltmeter. When the solid cell is heated, a current flows through the cell in consequence of the ability of the stabilized zirconium oxide to conduct oxygen ions, the intensity of said current being determined by means of the millivoltmeter. The current intensity depends on the activity of the oxygen in the substance to be measured, and also on the temperature at the time in question.

It has also been proposed to measure the oxygen content of molten metals by using a reference substance, the oxygen activity of which is known and which is placed in a container of stabilized zirconium oxide. An electrode is inserted into the reference substance within the container and is in turn connected by way of a millivoltmeter to a second electrode extending into the melt.

Since the activity of the oxygen is dependent on the temperature of the molten metal, the temperature of the melt must be ascertained at the same time as the current flowing through the electrodes is measured. To make these measurements some difficulty is at first experienced because it is necessary to work with two measuring instruments, so that inactivities both in respect of time and in respect of situation influences the final result or measurements, particularly as the distribution of temperature over the melt is not always regular. Exact determination of the oxygen content of the melt is therefore entirely dependent on the ability to measure temperature and oxygen activity at exactly the same position in the melt. The object of the invention is an apparatus which enables this to be done.

According to the present invention apparatus for use in determining the oxygen content of molten metals comprises a tubular container formed of stabilized zirconium oxide, fired to gas-tightness, in which the reference substance is placed. Layers of stabilized zirconium, permeable to gas are applied, such as by sintering, to the outer wall and bottom of the container in order to prevent the latter from bursting due to the temperature shock which occurs on being immersed in the melt, that is to say to increase the resistance of the container to temperature changes. A thermocouple is incorporated by sintering in a layer of stabilized zirconium oxide, which is applied, by sintering, within the bottom of the tubular container while a millivoltmeter measuring the temperature of the metal is connected between the arms of the thermocouple. One of the arms of the thermocouple serves at the same time as an internal electrode. Between the latter and an external electrode, there is situated a voltmeter for measuring the electro-motive force (EMF) of the galvanic cell composed of the reference substance, the container, and the melt.

The external electrode connected to the melt is preferably incorporated by sintering in the outer layer of stabilized zirconium oxide, which is permeable to gas and itself applied by sintering to the tubular container. In this manner a self-contained apparatus is obtained which is particularly simple to handle. At the same time it has been found convenient for the measuring container to be detachably connected to a metal extension tube which establishes the electrical connection between the external electrode and the voltmeter.

The container, which is to be immersed in the melt and contains the reference substance may consist of a small cylindrical gas-tight tube, e.g. of quartz or sillimanite, of which the end immersed in the melt is closed by a plug of stabilized zirconium oxide (fired to gas tightness), a layer of stabilized zirconium oxide permeable to gas being applied by sintering to the outside of the plug. Here again the junction of the thermocouple is located in a sintered or compacted layer of stabilized zirconium oxide provided on the plug. Apart from known metals having a high melting point, alternative materials for the external electrode have been found to be metal-ceramic mixtures, such as cermets of zirconium oxide and niobium, or zirconium oxide and vanadium and also zirconium boride and various high melting carbides and nitrides.

The invention is illustrated in the accompanying drawings.

Referring to FIGURE 1, the apparatus comprises a tubular container 1, which is open at the top to receive a downwardly extending tube 8 for admission of a reference or comparison fluid of known, e.g. oxygen activity. The container 1, which is immersed in the metal melt S whose oxygen content is to be measured, is formed of stabilized zirconium oxide fired to a condition of gas tightness; in the bottom of container 1 is arranged a layer 2 of stabilized zirconium oxide applied by sintering, but which is permeable to gas and embedded in which is a thermocouple T, being incorporated therein by sintering and the arms 3, 3′ of which are connected to a millivoltmeter 4.

The outer surface of container 1 is coated with a layer of zirconium oxide 5, which is permeable to gas and is applied by sintering to the exterior of the pipe 1. Embedded such as by sintering in the surface layer 5 is a metal electrode 6, the electrode, which is connected to valve voltmeter 7 preferably consisting of the same metal or metal alloy as the limb 3' of the thermocouple, which is connected both to the millivoltmeter 4 and to the valve voltmeter 7.

In operation a reference gas having known oxygen activity (oxygen partial pressure), e.g. air, is introduced through tube 8 to the sintered layer 2 which is permeable to such gas in the zirconium oxide container 1 and within which is the thermocouple T. When the container 1 is subjected by immersion in the molten metal S of unknown oxygen activity, the valve voltmeter 7 registers an electromotive force (EMF) from which the oxygen activity of the melt can be determined by calculation provided the temperature of the melt S is taken into account. If desired the valve voltmeter can be calibrated so that a measurement of oxygen activity can be read directly from its scale.

Referring now to FIGURE 2 there is shown an embodiment having a measuring head, corresponding to FIGURE 1, detachably connected to an electrically conductive metal tube 10, to which the external electrode 11 is attached by a terminal screw 11', the electrode 11 corresponding to the electrode 6 of the apparatus of FIGURE 1. The melt 13 is contained in a furnace or in a ladle or scoop indicated at 12.

In the apparatus of FIGURE 3 provision is made to permit of rapid changing of the measuring container. Mutually insulated spring metal contact blades 14 provided on the measuring container 1 are connected to the limbs 3, 3' of the thermocouple T. These contacts establish a conductive connection for the thermocurrent to the millivoltmeter 4 through corresponding contacts 15 which are inserted in a ceramic body or plug 16, and likewise insulated from one another, and thence through the equalizing lines 17. The external electrode 11 is screwed to an electrically conductive tube 18, e.g. formed of iron, which is conductively connected to the voltmeter 7 through connections 19, which extend through insulating sleeves into the conducting tube. The ceramic body 16 is cemented at 20 into the iron or other conducting tube 18, and the gas supply pipe 8 is connected through a seal 21 into a pipe 22, into which the reference gas, e.g. air, is introduced. The reference gas leaves the measuring container 1 through a bleed aperture 23 in the side.

In order to protect the contacts 14 and 15 against thermal radiation and splashes of metal or slag, use is made of a radiation protector 24 of heat insulating material, e.g. of hard asbestos, over which a metal hood 25 closed at one end can be pushed in cases when the device has to be introduced into the metal melt 13 through a blanket of slag.

The external electrode 11 may consist of a double walled metal tube, for example of copper, which is cooled with water.

Referring to FIGURE 4 there is shown a measuring apparatus substantially similar to the measuring apparatus of FIGURE 2, but instead of the container 1 of stabilized zirconium oxide, a cylindrical gas-tight tube 26, of quartz, sillimanite or other suitable material is used. The end of the tube 26 in the melt 13 is closed by a plug 27, which consists of stabilized zirconium oxide fired to gas tightness and on which there is provided an inner layer 28 of compacted or a sintered stabilized zirconium oxide, the junction of the thermocouple T lying in said layer 28. On the outside, that is to say on that side in contact with the molten metal, the plug carries a layer 29 of stabilized zirconium oxide permeable to gas, which is applied by sintering. This arrangement has the advantage that the measuring container 26, 27 can be manufactured in a particularly simple and inexpensive manner.

Readings are obtained from the measuring device of this invention by effecting the measurement of the electromotive force (EMF) from which is determined the oxygen potential of the melt after the measuring container 1; 26, 27 has been immersed in the melt 13 and only when the millivoltmeter 4 connected to the limbs 3, 3' of the thermocouple T indicates a constant temperature.

The particular advantage obtained by use of the device according to the invention is that it is now possible by means of a single measurement to determine within a short time both the temperature and the oxygen content, which is dependent on said temperature, of for example a steel melt. This not only facilitates and improves, e.g. the deoxidization of iron and iron alloys, but also enables the charge pattern, for example of converter melts, to be supervised and controlled not only in respect of temperature but also in respect of oxygen content.

The term "stabilized zironium oxide" means a solid solution of zirconium oxide with for example calcium oxide (lime) or magnesium oxide (magnesia) and is sometimes referred to as stabilized zirconia.

What is claimed is:

1. In apparatus for determining the oxygen content of molten metal, the combination of a tubular container immersible in the molten metal, said tubular container being formed in part at least of stabilized zirconium oxide rendered impermeable to gas and having applied to its inner and outer surfaces a surface layer of zirconium oxide which is permeable to gas, means for introducing a reference substance to the container, a thermocouple incorporated in the inner bottom layer of zirconium oxide, means for measuring the temperature of the molten metal in which said container is immersible including a millivoltmeter and means electrically connecting said millivoltmeter to said thermocouple, said electrically connecting means comprising an inner electrode of a galvanic cell set up between the reference substance, the container and the melt, and having an outer electrode spaced from said inner electrode, said inner electrode terminating at said thermocouple, and a voltmeter electrically connected between said outer and inner electrodes for measuring the EMF of the galvanic cell.

2. Apparatus according to claim 1, in which said tubular container is formed of stabilized zirconium oxide and is impermeable to gas throughout its length.

3. Apparatus according to claim 2, in which said outer electrode of said galvanic cell comprises a wire, said wire being incorporated in the outer layer of stabilized zirconium oxide on the tubular container.

4. Apparatus according to claim 1, in which the electrical connection between said voltmeter and said outer electrode comprises a tube formed of electrically conductive material, said tubular container being detachably supported within said tube and projecting therefrom.

5. Apparatus according to claim 4, including means provided on said tube for supporting said outer electrode, said outer electrode having a free end extending to a point adjacent the end of said tubular container projecting from said tube.

6. Apparatus according to claim 1 in which said container comprises a tube formed of heat resistant non-electrolytic material, the end of the tube which is immersed within the melt being closed by a plug of stabilized zirconium oxide, said plug having inner and outer layers of stabilized zirconium oxide permearble to gas, the inner layer containing said thermocouple.

7. In apparatus for determining the oxygen content of molten metal, the combination of a tubular container immersible in the molten metal, said tubular container comprising a first component formed of electrically conductive material, an intermediate second component and a third component formed in part at least of stabilized zirconium oxide rendered impermeable to gas and having applied to its inner and outer surfaces a surface coating of zirconium oxide which is permeable to gas, means for introducing a reference substance to said container, a thermocouple incorporated in the inner bottom layer of zirconium oxide, electrical connections for the thermocouple extending lengthwise of said third component and provided with terminal contacts located externally thereof, said intermediate component being formed of non-conductive material and having second terminal contacts for detachable connection with the said first terminal contacts of said third component means for measuring the temperature of the molten metal on immersion of said container within the molten metal whose oxygen content is to be determined, said means including a millivoltmeter and means electrically connecting said millivoltmeter to said thermocouple, said electrically connecting means comprising lead wires extending through said first and second components and connected to said second terminal contacts, one of said connections within said third component also forming an inner electrode of a galvanic cell set up between the reference substance, the container and the melt, said galvanic cell further including an outer electrode spaced from said inner electrode, and a voltmeter electrically connected between said outer and inner electrodes for measuring the EMF of the galvanic cell.

8. Apparatus according to claim 7, including means provided on said first component for supporting said external electrode.

9. Apparatus according to claim 8, including electrical connections between said support means for said outer electrode and said voltmeter comprising external insulated contacts on said first component, said contacts having an electrical connection located within the interior of said container and one of said contacts having means for supporting said outer electrode.

References Cited

UNITED STATES PATENTS

| | | | |
|---|---|---|---|
| 3,297,551 | 1/1967 | Alcock | 204—1.1 |
| 3,309,233 | 3/1967 | McPheeters et al. | 136—153 |
| 3,359,188 | 12/1967 | Fischer | 204—1.1 |
| 3,378,478 | 4/1968 | Kolodney et al. | 204—195 |

OTHER REFERENCES

Kinkkola et al.: "J. of the Electrochemical Soc.," vol. 104, No. 6, June 1957, pp. 379–381.

Horsley: "AERE" R 3427, pp. 1–3 (1961).

JOHN H. MACK, Primary Examiner

T. TUNG, Assistant Examiner

U.S. Cl. X.R.

136—86, 153